Dec. 28, 1954    J. W. DICKASON    2,698,118
WHEEL CARRIER

Filed Aug. 20, 1951    2 Sheets-Sheet 1

INVENTOR.
John W. Dickason
BY
Harness and Harris
ATTORNEYS.

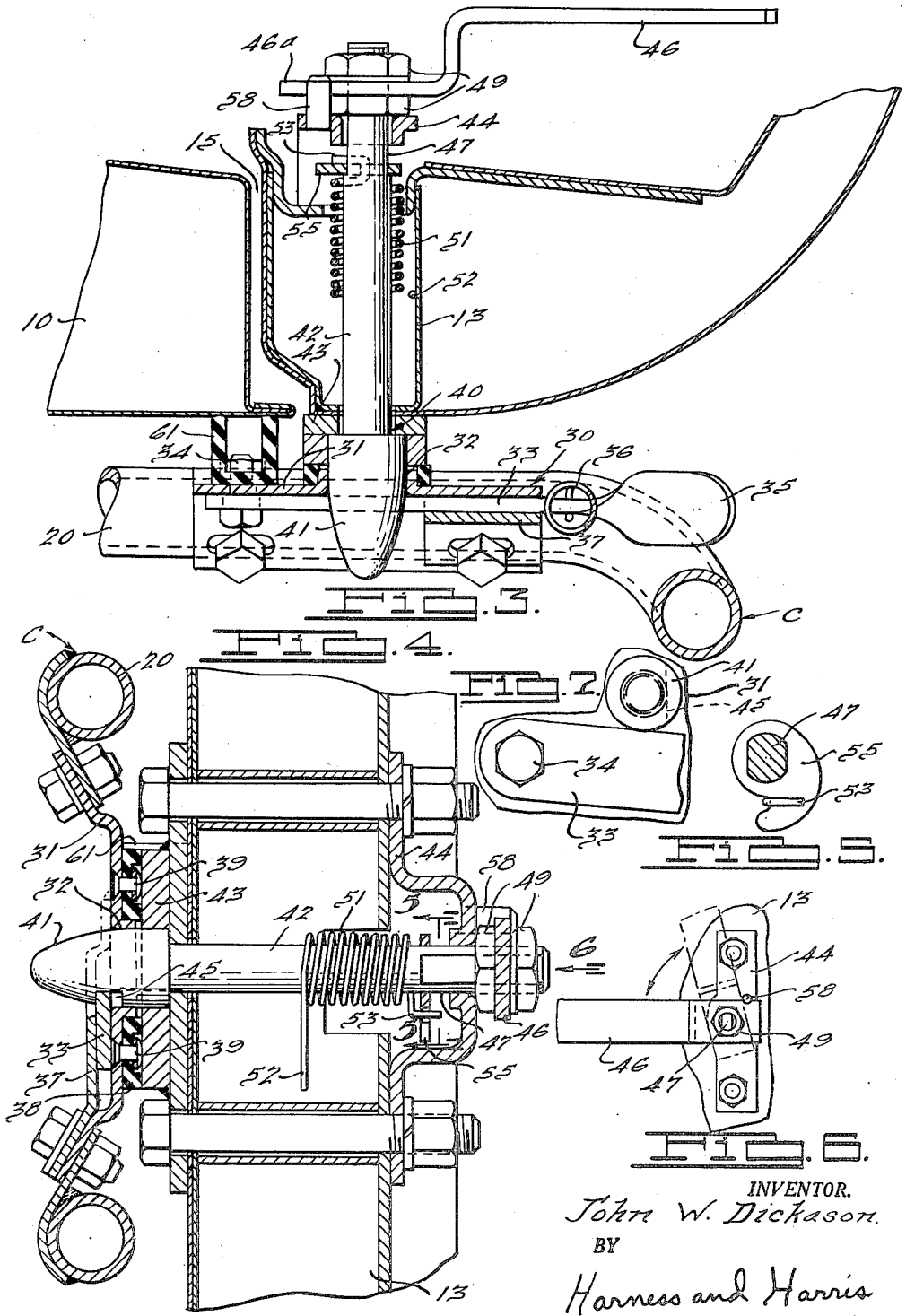

United States Patent Office 2,698,118
Patented Dec. 28, 1954

2,698,118

WHEEL CARRIER

John W. Dickason, Royal Oak, Mich., assignor to Chrysler Corporation, Highland Park, Mich., a corporation of Delaware Application August 20, 1951, Serial No. 242,589

4 Claims. (Cl. 224—42.21)

This invention relates to a spare wheel and spare tire carrier for motor vehicles and particularly to a carrier adapted for commercial or military vehicles wherein it is not advantageous or feasible to use storage space within the load carrying compartment of the vehicle to store the spare tire and spare wheel.

It is a primary object of this invention to provide a spare tire and spare wheel carrier that may be mounted on the exterior of the motor vehicle at a location where it is readily accessible yet where its mounting will not require any major alteration or modification of the motor vehicle body or chassis.

It is another object of this invention to provide a spare tire and wheel carrier for a motor vehicle that is mountable on the exterior of the vehicle body adjacent a hinged door of the body yet arranged such that it does not materially interfere with the normal usage of the associated door.

It is a further object of this invention to provide a hingedly supported spare tire and wheel carrier that is adapted to be mounted on the motor vehicle body adjacent the exterior side of a hingedly mounted door of the motor vehicle cab compartment and cooperatively associated with the cab compartment door in such a manner that it does not restrict or interfere with the normal use of the door.

It is still another object of this invention to provide a spare tire and wheel carrier having a hinged mounting on the exterior of the vehicle body and novel means for latching the carrier in its "stored" position and for releasing the carrier from its "stored" position.

Other objects and advantages of this invention will become readily apparent from a reading of the attached specification and a consideration of the related drawings wherein:

Fig. 3 is an enlarged, fragmentary, sectional elevational view of the carrier latching mechanism, the view being taken on the line 3—3 of Fig. 1;

Fig. 4 is an enlarged, fragmentary, sectional elevational view of the carrier latching mechanism, the view being taken along the line 4—4 of Fig. 1;

Fig. 5 is an enlarged, fragmentary, sectional elevational view of a portion of the latch bolt return spring device used in the latching mechanism for this spare tire and wheel carrier, the view being taken along the line 5—5 of Fig. 4;

Fig. 6 is a fragmentary side elevational view, to a reduced scale, of the inside latch bolt release lever for the carrier latching mechanism; and Fig. 7 is a fragmentary side elevational view of the latch bolt and latching lever engageable parts when the latch bolt has been rotated to a position to disengage said parts.

Figure 1:
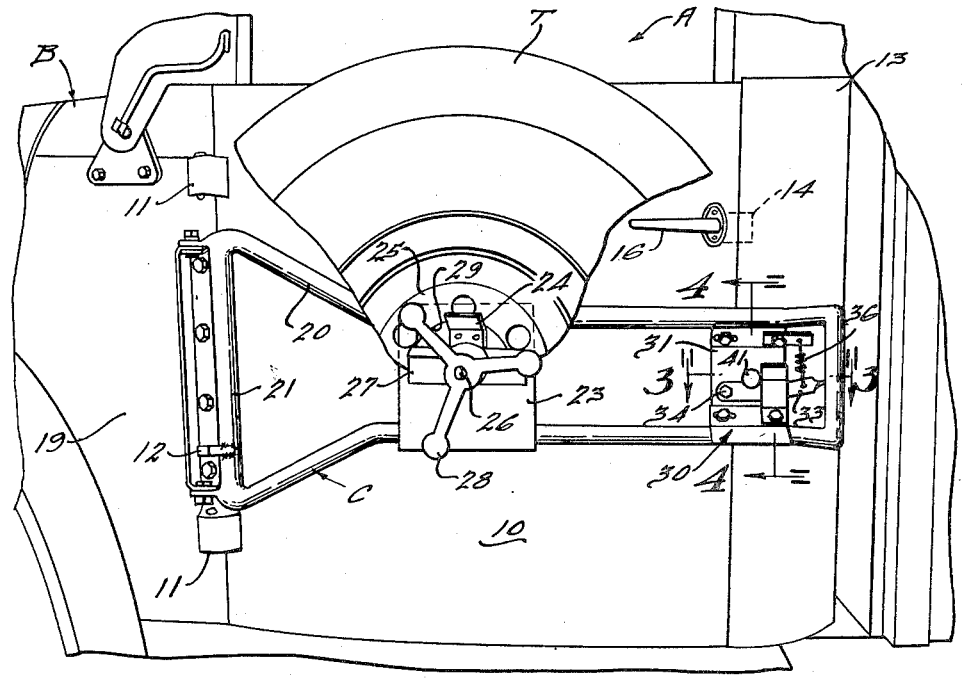
Fig. 1 is a fragmentary side elevation of a portion of the exterior of a motor vehicle body cab compartment that has the herein disclosed spare tire and wheel carrier mounted thereon and latched in its "stored" position.
Figure 2:
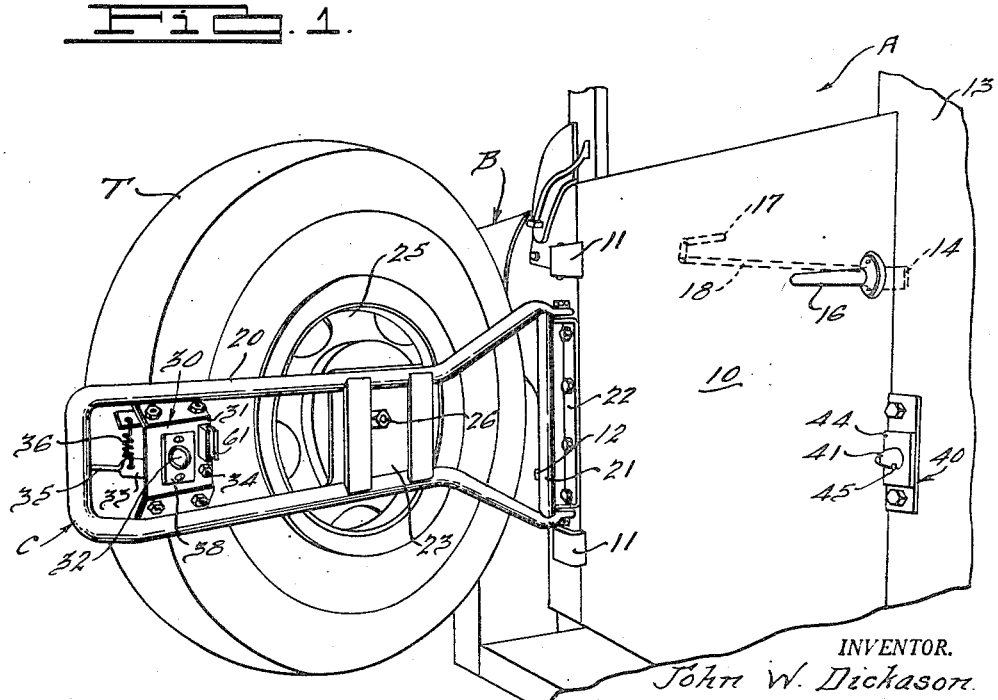
Fig. 2 is a perspective of the structure shown in Fig. 1 with the spare tire and wheel carrier shown in its "released," outwardly disposed, position.

Figs. 1 and 2 of the drawings show a portion of the side of the cab compartment A of a motor vehicle body B. As is conventional, the body B includes a door 10 that is swingably mounted, by the hinges 11, on the body B along the forward edge of the cab door opening 15. Door 10 may swing outwardly about the vertically extending pintle pins of the hinges 11 so that one may readily enter and exit from the interior of the cab compartment A. Door 10 is designed to be latched to the rearwardly positioned vehicle body door jamb member 13 by means of any form of conventional door latch mechanism 14. Latch 14 has an exteriorly disposed latch releasing handle 16 and an interiorly disposed latch releasing handle 17, the latter handle being connected to the latch 14 by the control linkage 18.

The spare tire and wheel carrier C includes a substantially rectangularly shaped, tubular, frame 20 that has the forwardly positioned, vertically extending, side 21 thereof hingedly connected to the vehicle body cowl portion 19 by the vertically extending hinge element 22. Hinge element 22 permits the carrier frame 20 to swing about its vertically extending hinge axis in an arc similar to that described by the movement of the hingedly mounted door 10. Frame 20, centrally of its length, carries a wheel support plate 23 that may be fixedly connected to the frame 20 by welding or the like. Wheel support plate 23 is flush with the frame 20 and has an outwardly and upwardly extending cleat 24 fixed to its outer side. Cleat 24 is adapted to be positioned in any suitable aperture through the wheel disc 25, such as the axle receiving aperture 29, so as to provide a hanger-like support for the spare wheel 25 on the carrier 20. Support plate 23 also mounts an outwardly extending threaded lock bolt 26 that is also adapted to be inserted through the wheel disc aperture 29. A wheel disc locking bar 27, that has an opening therein to loosely receive the bolt 26, is adapted to be inserted on the bolt 26 after the wheel disc 25 has been mounted on the cleat support 24. It is thought to be obvious that the length of locking bar 27 is greater than the diameter of the aperture 29 in the wheel disc 25. After mounting locking bar 27 on bolt 26 the winged clamping nut 28 is threaded on the bolt 26 and screwed up tight against the locking bar 27 so as to lock the wheel disc 25 on the carrier frame support plate 23.

Carrier frame 20, at its rear end portion, mounts a latch mechanism 30 that is adapted to be engaged with a latch bolt mechanism 40 carried by the vehicle body door jamb portion 13. Latch mechanism 30 includes the base plate 31 that is rigidly mounted in a flush relationship on the carrier frame 20 by bolting and/or welding or the like. Base plate 31 is adjustable relative to carrier frame 30 for alignment purposes. Plate 31 has an opening 32 formed therein to matingly receive the outwardly projecting substantially bullet-shaped end 41 of the vehicle body mounted latch bolt 42. Base plate 31 also mounts a latching lever 33 that is pivotally connected to the plate 31 by the pivot pin 34. Latching lever 33 is formed with a finger or thumb grip portion 35 to facilitate actuation of the lever 33 about its pivot pin 34. A tension spring 36 is connected between the lever 33 and the base plate 31 so as to continuously urge the free end of the latching lever 33 upwardly or in a counterclockwise direction for a purpose that will subsequently become apparent. Base plate 31 also mounts a resilient bumper element 38 that is adapted to cushion the engagement of the carrier latching mechanism 30 with the vehicle body supported latch bolt mechanism 40 when the carrier C is swung to its normal "stored" position. Bumper element or block 38 is mounted on the base plate 31 by rivets 39 or similar connections. Base plate 31 also includes a guide bar 37 that guides and limits the swinging or pivotal movement of the latching lever 33 of the thumb latch mechanism 30.

The latch bolt mechanism 40 that is mounted in the vehicle body door jamb portion 13 includes the rotatable latch bolt 42 that is journaled at its opposite ends by the body supported bumper block 43 and the U-shaped bracket 44 respectively. The outwardly projecting, bullet-shaped end 41 of the latch bolt 42 has a slot 45 formed along the normally lower or underside thereof (see Figs. 2 and 4). Slot 45 is designed to receive a portion of the upper edge of the latching lever 33 when the carrier C is swung to its "stored" or "closed" position so as to lock or hold the wheel and/or tire carrier in its "stored" position. The bullet-shaped contour of latch bolt end 41 provides a cam device that cooperates with the spring mounted lever 33 to provide means for the automatic latching of the carrier C to the vehicle body B as the carrier is swung to its so-called "stored" position. Rotatable latch bolt 42 has an operating lever 46 fixed to the inner end thereof (see Figs. 3, 4 and 6) so as to provide a means for releasing the latching lever 33 from the latch bolt 42 from within the cab compartment A. As the bolt 42 is rotated clockwise (viewed from inside the cab looking out) by the clockwise movement of the operating lever 46, the slot 45 in the lower side of bolt end 41 is moved out of engagement with the edge of latch lever 33 and the lever 33 is cammed downwardly (see Fig. 7) to a released position so that the carrier C is then free to swing to its outward position as shown in Fig. 2. Threaded about the shaft of latch bolt 42 is a coil spring 51 that has one end portion 52 anchored to a portion of the door jamb member 13 by any means that will prevent rotation of the spring end 52 by a clockwise rotation of the opposite end 53 of the spring 51. The end 53 of spring 51 is anchored to a washer-like lever element 55 that is fixedly mounted on the inner end portion 47 of the latch bolt 42. Also fixedly mounted on the inner end portion 47 of the latch bolt 42 by means of nuts 49 is the interiorly positioned latch releasing lever 46. It is thought to be obvious that clockwise rotation of the latch release lever 46 will rotate latch bolt 42 so as to disengage cam slot 45 from the latching lever 33. At the same time this clockwise bolt movement will tension the spring 51 so as to provide a force that will urge the bolt 42 to rotate counterclockwise to return to its normal latching position. The bracket member 44 mounts a stop pin 58 that engages the free end 46a of the lever 46 to normally position the latch bolt locking slot 45 in its latching or locking position.

From the above description of this invention it is thought that the operation thereof is rather obvious. To enter the cab compartment A from the exterior of the vehicle, the latch lever 33 is grasped by the thumb portion 35 and depressed so as to release lever 33 from the latch bolt locking slot 45. Thereafter the carrier C may be swung from its "stored" position to its open or "released" position as shown in Fig. 2. With carrier C moved to a position where it no longer blocks the opening movement of the door 10, then the exterior door lock release handle 16 may be operated to unlock door latch 14 and permit the door 10 to be swung to an open position for ready access to the interior of cab compartment A. After entering the cab A the operator first swings the door 10 to its closed position and thereafter carrier C may be moved to its "stored" position by merely grasping the tire T, that is mounted on the wheel disc 25, and pulling the carrier C towards the door 10. Latching lever 33 will be cammed into latching position by its engagement with the bullet-shaped end 41 of the latch bolt 42. To leave the cab A the operator first rotates the interiorly positioned latch release lever 46 clockwise through about an 80 degree arc and this will release the latching lever 33 from bolt slot 45 so that the carrier C can be swung to a released or open position. The door 10, which may be unlocked by interiorly positioned handle 17, can be used to push carrier C to its open position. Alternatively carrier C can be first swung to an open position by reaching through the door window opening and thereafter the door 10 may be moved to open position in normal manner.

It is thus seen that the spare wheel and tire carrier C disclosed provides an accessory unit that may be readily applied to any vehicle without any major alteration thereof. Furthermore, this carrier C positions the spare wheel and tire where it is readily accessible for immediate use with a minimum of labor. At the same time valuable load carrying capacity within the vehicle is not utilized for storage of the spare wheel and tire.

Another noteworthy advantage obtained from this spare wheel and/or tire carrier device is the rigidifying effect of the carrier C on the body B. For "stored" or locked position the carrier C ties together the cowl or hinge pillar portion 19 and the door keeper plate pillar portion 13 so as to provide an increased resistance to body springing or twisting about the door opening 15. This point is of particular importance in military vehicles having a soft top over the cab compartment for in such constructions there is no rigid top construction to tie together the two sides of the door opening and body twisting frequently permits the doors to spring open. The carrier C obviously would prevent the door 10 from springing open and it also rigidifies the body B around the door opening 15.

I claim:

1. In combination a vehicle body having a door opening therein and a door hingedly mounted on said body and arranged to be moved between positions closing and uncovering said door opening, releasable latch means, operable from either side of said door, to retain said door in a position closing said opening, and a spare wheel carrier hingedly mounted on the vehicle body at one side of said door opening and arranged to be swung between a position adjacent the exterior side of said door closing said opening and a position remote therefrom uncovering said opening, said carrier including releasable latch means engageable with cooperating means mounted on said body at the other side of said door opening to retain said carrier in the position adjacent said door, said carrier providing a rigid strut interconnecting the opposite sides of said door opening when the carrier is latched to the body adjacent the exterior side of the door.

2. In combination a vehicle body having a door opening therein and a door hingedly mounted on said body and arranged to be moved between positions closing and uncovering said door opening, releasable latch means, operable from either side of said door, to retain said door in a position closing said opening, and a spare wheel carrier hingedly mounted on the vehicle body at one side of said door opening and arranged to be swung between a position adjacent the exterior side of said door closing said opening and a position remote therefrom uncovering said opening, said carrier including releasable latch means engageable with cooperating means mounted on said body at the other side of said door opening to retain said carrier in the position adjacent said door, and separate means operable from within and without said body to release the carrier latch means to permit movement of said carrier relative to said door, said carrier providing a rigid strut interconnecting the opposite sides of said door opening when the carrier is latched to the body adjacent the exterior side of the door.

3. A spare wheel carrier comprising a substantially rectangular frame having a hinge mechanism connected to one end thereof and arranged to provide for rotation of the frame about an axis extending substantially parallel to the plane of the frame and transversely of the length of said frame, a spare wheel support plate fixed to said frame having wheel support means thereon, and latch mechanism carried by the other end of said frame comprising a base plate having an opening therethrough, a latching lever mounted on said base plate, means normally urging said latching lever to a position partially blocking passage through said opening, and a latch bolt having a portion adapted to be inserted through said base plate opening and to be latchingly engaged with said latching lever, said latch bolt having camming means to effect release of said latching lever, and resilient means normally resisting operation of said camming means, said latching means also including a lever connected means to effect release of said latching lever from said latch bolt.

4. In combination a vehicle body having a door opening therein and a door hingedly mounted on said body and arranged to be moved between positions closing and uncovering said door opening, releasable latch means, operable from either side of said door, to retain said door in a position closing said opening, and a spare wheel carrier hingedly mounted on the vehicle body at one side of the door opening and arranged to be swung between a position adjacent the exterior side of said door closing said opening and a position remote therefrom uncovering said opening, said carrier comprising a substantially rectangular frame having a hinge mechanism connected to one end thereof and arranged to provide for rotation of the frame about an axis extending substantially parallel to the plane of the frame and transversely of the length of said frame, a spare wheel support plate fixed to said frame, and latch mechanism carried by the other end of said frame comprising a base plate flush with said frame having an opening therethrough, a latching lever mounted on said base plate, resilient means normally urging said latching lever to a position partially blocking passage through said opening, and a latch bolt mounted on the vehicle body at the other side of the door opening having a portion adapted to be inserted through said base plate opening and to be latchingly engaged with said latching lever when said frame is swung to a position closing the door opening, said carrier providing a rigid strut interconnecting the opposite sides of said door opening when the carrier is latched to the body adjacent the exterior side of the door.

References Cited in the file of this patent

UNITED STATES PATENTS

| Number | Name | Date |
|---|---|---|
| 883,274 | Bailey | Mar. 31, 1908 |
| 993,632 | Alperin | May 30, 1911 |
| 1,519,751 | Baker | Dec. 16, 1924 |
| 1,671,289 | Hoopaw et al. | May 29, 1928 |
| 1,696,137 | Colson | Dec. 18, 1928 |
| 1,926,350 | Olson | Sept. 12, 1933 |

FOREIGN PATENTS

| Number | Country | Date |
|---|---|---|
| 215,502 | Great Britain | May 15, 1924 |